(12) United States Patent
Angquist et al.

(10) Patent No.: US 8,519,679 B2
(45) Date of Patent: *Aug. 27, 2013

(54) STATIC VAR COMPENSATOR APPARATUS

(75) Inventors: Lennart Angquist, Enkoping (SE); Lars Paulsson, Vittsjo (SE); Ake Petersson, Vasteras (SE); Bjorn Thordvaldsson, Kolback (SE)

(73) Assignee: ABB Technology AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,707

(22) Filed: Sep. 13, 2012

(65) Prior Publication Data

US 2013/0009614 A1 Jan. 10, 2013

Related U.S. Application Data

(63) Continuation of application No. 13/169,747, filed on Jun. 27, 2011, which is a continuation of application No. 12/620,996, filed on Nov. 18, 2009, now Pat. No. 7,986,132, which is a continuation of application No. PCT/EP2008/055794, filed on May 12, 2008.

(60) Provisional application No. 60/924,536, filed on May 18, 2007.

(51) Int. Cl.
*G05F 3/00* (2006.01)
*G05F 1/70* (2006.01)
*G05F 5/00* (2006.01)

(52) U.S. Cl.
USPC .......................................... 323/210; 307/105

(58) Field of Classification Search
USPC ................ 323/205, 207, 208, 209, 210, 211; 307/105

See application file for complete search history.

(56) References Cited

U.S. PATENT DOCUMENTS

| 4,571,535 A | 2/1986 | Gyugyi |
| 4,686,447 A | 8/1987 | Takeda et al. |
| 6,359,423 B1 | 3/2002 | Noro |
| 7,986,132 B2 * | 7/2011 | Angquist et al. ............. 323/210 |
| 2001/0028198 A1 | 10/2001 | Joho |
| 2004/0120166 A1 | 6/2004 | Bijlenga |
| 2011/0254518 A1 * | 10/2011 | Angquist et al. ............. 323/208 |

FOREIGN PATENT DOCUMENTS

| EP | 0858141 A2 | 8/1998 |
| GB | 2285523 A | 7/1995 |
| WO | 9601516 A1 | 1/1996 |
| WO | 9706589 A1 | 2/1997 |
| WO | 03034566 A1 | 4/2003 |
| WO | 2005022716 A1 | 3/2005 |

OTHER PUBLICATIONS

International Search Report and Written Opinion of the International Searching Authority; PCT/EP2008/055794; 7 pages. Oct. 29, 2008.

* cited by examiner

*Primary Examiner* — Harry Behm
*Assistant Examiner* — Matthew Grubb
(74) *Attorney, Agent, or Firm* — St. Onge Steward Johnston & Reens LLC

(57) ABSTRACT

A one-phase static var compensator apparatus includes a compensator string consisting of a first static var compensator connected serially to a thyristor valve. The compensator string is arranged to be connected on its first end to one phase of a transmission grid of a rated voltage exceeding 69 kV. Moreover, the thyristor valve includes a plurality of thyristors connected serially and the compensator string is arranged to be directly connected to the transmission grid. A corresponding three phase apparatus is also presented.

17 Claims, 6 Drawing Sheets

STATIC VAR COMPENSATOR APPARATUS

CROSS-REFERENCE TO RELATED APPLICATIONS

The present application is a continuation of pending U.S. patent application Ser. No. 13/169,747, filed Jun. 27, 2011, which is in turn a continuation of U.S. patent application Ser. No. 12/620,996, filed Nov. 18, 2009, now issued U.S. Pat. No. 7,986,132, which is a continuation of International patent application PCT/EP2008/055794 filed on May 12, 2008, which designates the United States and claims the benefit under 35 U.S.C. §119(e) of the U.S. Provisional Patent Application Ser. No. 60/924,536 filed on May 18, 2007. The content of all prior applications is incorporated herein by reference.

FIELD OF THE INVENTION

The present invention relates generally to static var compensator apparatuses, and more particularly to how static var compensator apparatus are connected to transmission grids.

BACKGROUND OF THE INVENTION

Shunt compensators are used in high voltage networks to compensate for excessive reactive power consumption or generation. Thyristors are often used to allow control of the exchanged reactive power of such shunt compensators on a per cycle basis.

A conventional way of connecting shunt compensators can be seen in FIG. 1. An interfacing transformer 101 is used between the transmission grid 102 and the thyristor controlled/switched reactive power elements, to adapt the rated high voltage of the transmission system to a lower voltage in the range 10-30 kV to which Thyristor Controlled Reactors (TCR) 103, Thyristor Switched Reactors (TSR) 103 and/or Thyristor Switched Capacitors (TSC) 104 are connected. Typically also shunt banks and/or harmonic filters 105 will be connected to the same low-voltage bus.

However, the connection of the prior art exhibits some drawbacks with respect to performance, such as transformer saturation at high capacitive delivery or at high grid voltage, reactive power consumption in the transformer and excessive rated secondary currents and very high short-circuit currents.

Consequently, there is a need to improve the use of shunt compensators in view of the prior art.

SUMMARY OF THE INVENTION

An object of the present invention is to simplify the arrangement related to static var compensators.

According to the invention there is provided a one-phase static var compensator apparatus. The apparatus comprises a compensator string consisting of a first static var compensator connected serially to a thyristor valve. The compensator string is arranged to be connected on its first end to one phase of a transmission grid of a rated voltage exceeding 69 kV. Moreover, the thyristor valve comprises a plurality of thyristors connected serially. The compensator string comprises a capacitor connected in parallel to said thyristor valve, and the compensator string is arranged to be directly galvanically connected to the transmission grid.

By connecting the compensator string directly to the transmission grid, or grid, the transformer is omitted. This is made possible by the inclusion of the capacitor, providing protection from voltage surges, for example from lightning strikes. The capacitor can be connected in parallel to the entire thyristor valve, or each thyristor of the thyristor valve can have a corresponding capacitor connected in parallel. Not having a transformer provides a number of advantages, such as no acoustical noise from transformer, and more environmentally friendly oil-free installation without the need to have oil containment arrangements. Moreover, civil work at site is simplified. Other disadvantages related to transformers can be avoided, such as the need for heavy transformer transports, long delivery times for transformers, long repair time after damage, high costs (which are likely to increase with time), and upgrading (in terms of increasing the var range) of the compensator may be difficult because of transformer rating.

In this context, a thyristor valve is to be construed as a plurality of thyristors connected in series.

The first static var compensator of the compensator string may be arranged to be directly connected to the transmission grid.

The thyristor valve may comprise one hundred thyristors connected serially.

The thyristor valve may comprise bidirectional controlled thyristors.

The first static var compensator may comprise an inductor.

The compensator string may further comprise a second static var compensator, and the thyristor valve may be connected on its first end to the first static var compensator and the thyristor valve may be connected on its second end to a first end of the second static var compensator.

The second static var compensator may comprise an inductor.

The second static var compensator may comprise a capacitor.

A second aspect of the invention is a three-phase static var compensator apparatus comprising three one-phase apparatuses according to the first aspect, wherein each of the one-phase apparatuses is arranged to be connected to a respective one phase of a three phase transmission grid.

The compensator string may be arranged to be connected on its first end to the respective phase and on its second end to a transmission grid associated with a different phase than the respective phase, thus forming a delta connection.

The compensator string may be arranged to be connected on its first end to the respective phase and on its second end to a neutral point, thus forming a wye-connection. The number of semiconductor devices in wye-connection is significantly lower than if delta-connection for the full transmission network voltage would have been used.

The neutral point may be connected to a transmission grid.

The neutral may be provided using an artificial neutral from a z-transformer connected to the three respective phases.

A third aspect of the invention is a three-phase static var compensator apparatus comprising: two one-phase apparatuses according to the first aspect, wherein each of the two one-phase apparatuses is arranged to be connected on its respective first end to a respective one phase of two phases of a three phase transmission grid, and a static var compensator arranged to be connected on its first end to a third phase of the three phase transmission grid. Second ends of the two one-phase apparatuses are both directly connected to a second end of the third static var compensator.

A fourth aspect of the invention is a one-phase static var compensator apparatus comprising: a compensator string consisting of a first static var compensator connected serially to a thyristor valve. The compensator string is arranged to be connected on its first end to one phase of a transmission grid of a rated voltage exceeding 69 kV. The thyristor valve comprises a plurality of thyristors connected serially, the compensator string comprises a capacitor connected in parallel to the thyristor valve, and the compensator string comprises an autotransformer arranged to galvanically connect the compensator string to the transmission grid.

It is to be noted that any feature of the first aspect, second aspect, third aspect or third aspect may be applied to any other aspect, where appropriate.

Generally, all terms used in the claims are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
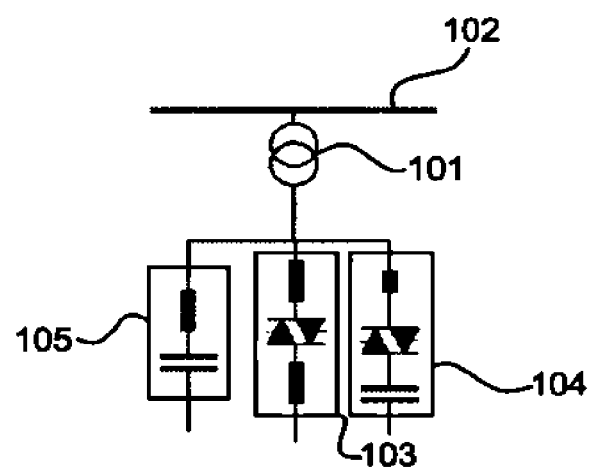
FIG. 1 is a schematic diagram illustrating a typical static var compensation for network reactive power compensation.
Figure 2A:
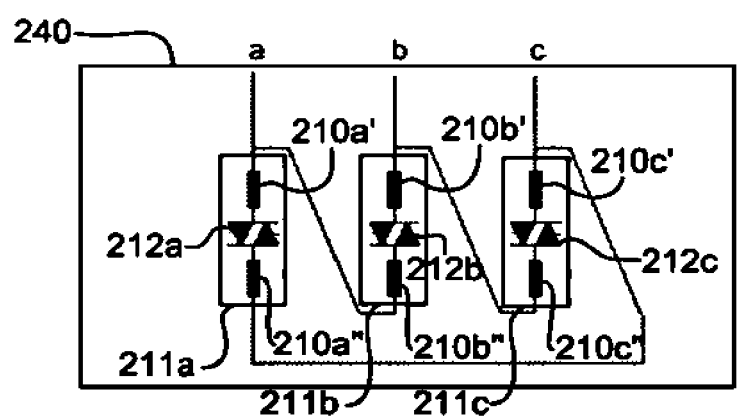
FIGS. 2a-b are schematic diagrams illustrating delta-connected static var compensation using thyristor controlled reactors and thyristor controlled capacitors, respectively.
Figure 2B:
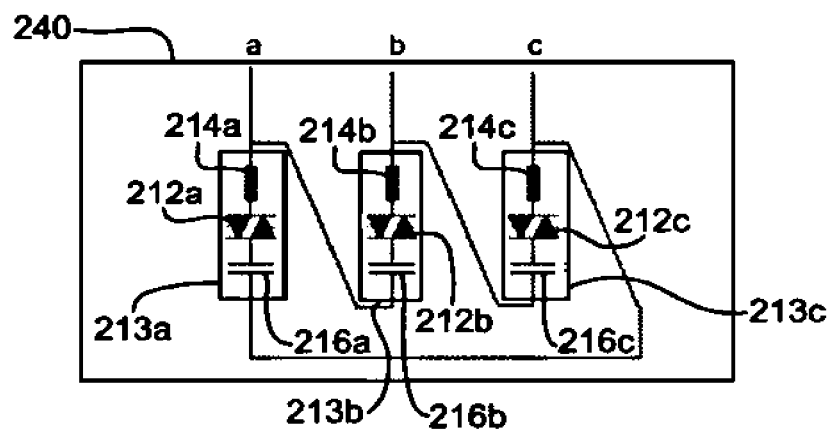
Figure 2C:
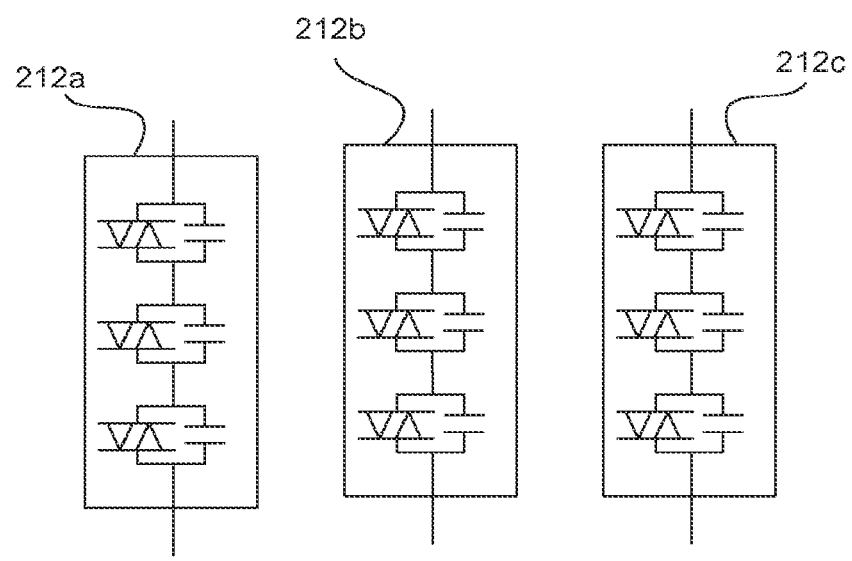
FIG. 2c is a schematic diagram illustrating an alternative embodiment for the thyristor valve where a capacitor connected in parallel with each thyristor.

FIGS. 2a-b are schematic diagrams illustrating delta-connected static var compensation using thyristor controlled reactors and thyristor controlled capacitors, respectively. In FIG. 2a thyristor controlled reactors (TCR/TSRs) are connected in a delta-connection between the phases, in a three phase static var compensator apparatus 240. The inductors 210a' & 210a", 210b' & 210b", 210c' & 210c", can be split in two parts 210a' & 210a", 210b' & 210b", 210c' & 210c" that are connected so that they are embedding the thyristor valve 212a-c. Optionally one inductor within each pair can be omitted. Each respective serial connection line of inductors 210a'-c', 210a"-c" and thyristor valve 212a-c is called a compensator string 211a-c. In FIG. 2b showing Thyristor Switched Capacitors (TSCs), the thyristor valve 212a-c is normally inserted between a damping inductor 214a-c and a capacitor bank 216a-c as shown in FIG. 2b. Each respective serial connection line of inductors 214a'-c', thyristor valve 212a-c, and capacitor bank 216a-c is called a compensator string 213a-c. FIG. 2c is an alternative embodiment illustrating the thyristor valve 212a-c including a capacitor connected in parallel with each thyristor.

In an alternative embodiment, the thyristor valves 212a-c are connected to the transmission grid, and the inductors and/or capacitors are in turn connected to the thyristor valves.

Figure 3:
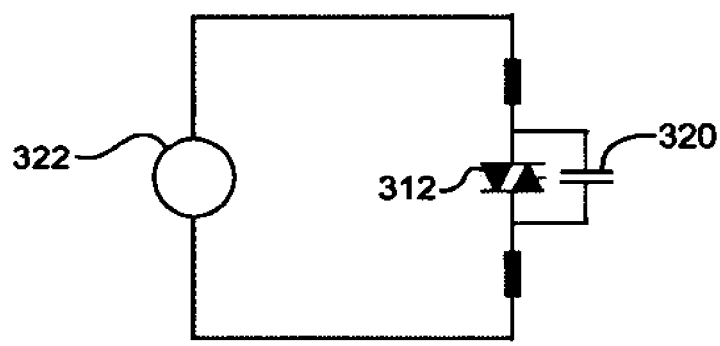
FIG. 3 is a schematic diagram illustrating a basic insulation level test arrangement.

FIG. 3 is a schematic diagram illustrating a basic insulation level test arrangement.

The SVC installation switchyard typically will be protected against direct lightning strokes by protective wires above the equipment or with high grounded masts. Therefore lightning strokes can not hit the point between the thyristor valve and the reactor but will be taken up by the combined reactor-thyristor valve string (TCR or TSR) or the combined reactor-thyristor valve-capacitor bank string (TSC). Accordingly the string design shall incorporate means to suppress and/or control steep voltage surges such that full basic insulation level (BIL) test voltage can be applied across the strings just mentioned and shown in FIGS. 2a and 2b. An example for thyristor controlled reactor is shown in FIG. 3. A test voltage generator 322 provides the voltage for the testing.

Special thyristor valve protective circuits may be required in order to fulfil this purpose. In FIG. 3 this has been indicated as a capacitor 320 connected in parallel with the thyristor pair 312. In a real implementation additional components may be necessary in order to protect the thyristor turn-on process as is well known for those skilled in the power electronics.

In this case the thyristor valves have to be designed for the full line-line voltage of the transmission networks. The current most often is moderate. Due to the high voltage a large number of components can be series-connected in the valve.

The third harmonic current produced by the compensator string 211a-c, will be included in the inductor current but captured and circulated within the delta-connection.

Figure 4:
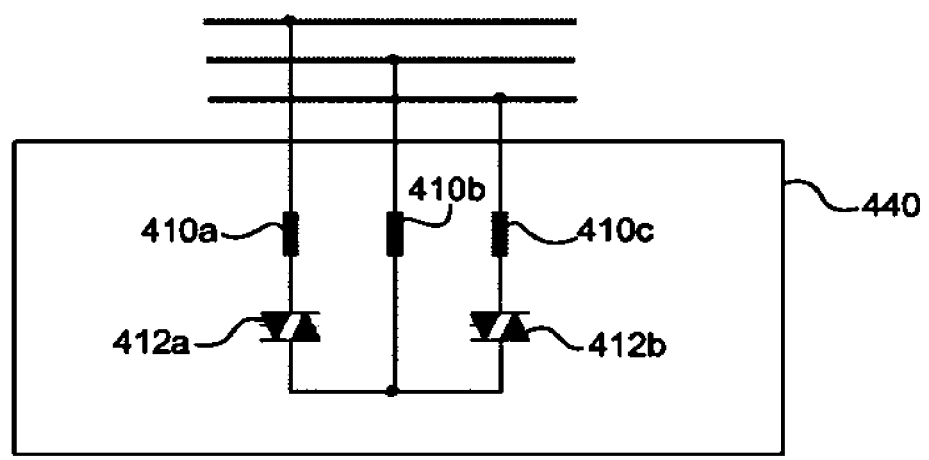
FIG. 4 is a schematic diagram illustrating static var compensation with a wye-connection without a neutral connection.

FIG. 4 is a schematic diagram illustrating static var compensation with a wye-connection without a neutral connection.

In principle also an SVC 440 with wye-connected strings of passive components (inductors and/or capacitor banks) 410a-c and thyristor valves 412a-b can be utilized. If the SVC does not operate with continuous control using phase-angle control but rather operates in a switching mode (fully on/fully off) only two valves 412a-b are required as shown in FIG. 4.

Figure 5:
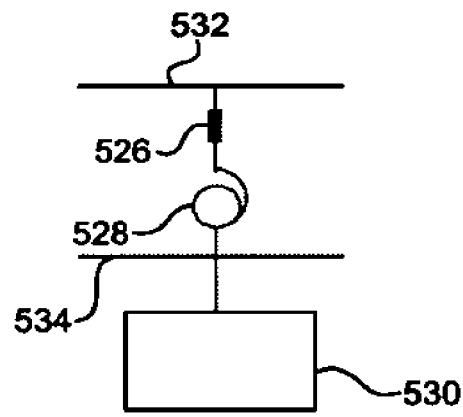
FIG. 5 is a schematic diagram illustrating static var compensation connected through an autotransformer.

FIG. 5 is a schematic diagram illustrating static var compensation connected through an autotransformer, which will now be described.

One way to reduce the transformer rating is to utilize an auto-transformer 528 as an interface to an SVC 530. FIG. 5 depicts the concept.

The rated power of the transformer is only a fraction of the total SVC power rating. If $U_2$ represents the voltage of the transmission grid 532 and $U_1$ represents the voltage of a SVC bus 534, then an apparent power $S_{trafo}$ can be expressed as a factor of an apparent power of the SVC $S_{SVC}$, as follows:

$$S_{trafo} = \left(1 - \frac{U_2}{U_1}\right) S_{SVC}$$

The autotransformer 528 leakage reactance is much lower than the leakage reactance in a transformer for the full SVC rating. This is often an advantage but in some cases it might be difficult to design the harmonic filters. If this is the case it might be advantageous to insert an extra inductor 526 in series with the autotransformer 528 as shown in FIG. 5. The extra inductor 526 can also be used to lower the voltage stress across the thyristor valve at BIL voltage test.

Figure 6:
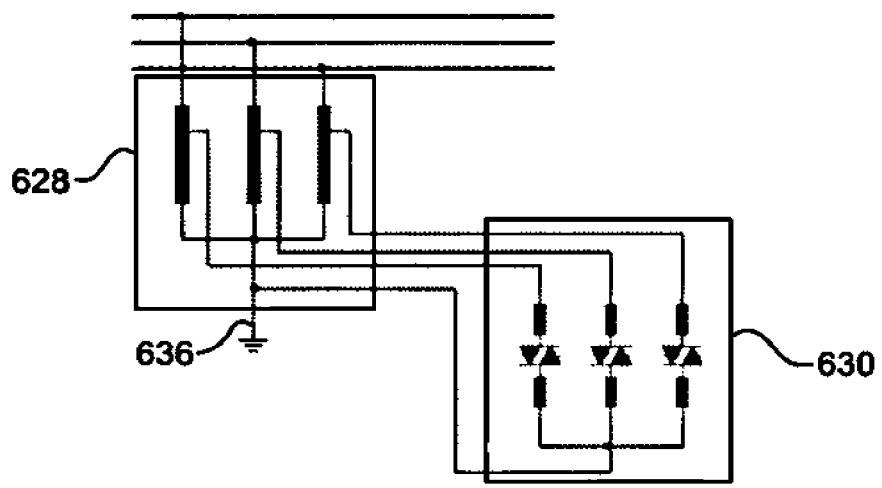
FIG. 6 is a schematic diagram illustrating static var compensation with autotransformer wye-connection with a neutral connection.

If the transmission system has a neutral from the transformer it is possible to utilize an SVC 630 in wye-connection as shown in FIG. 6. The figure shows a TCR but the SVC configuration 530 may include several TCRs, TSRs, TSCs and filter banks.

In this case the third harmonic current will pass through the autotransformer 628 neutral connection 636.

Like in the preceding cases an extra inductor may be connected (not shown in FIG. 6) between the autotransformer and the SVC in order to lower the voltage stress across the thyristor valves at BIL surge voltage tests.

Figure 7:
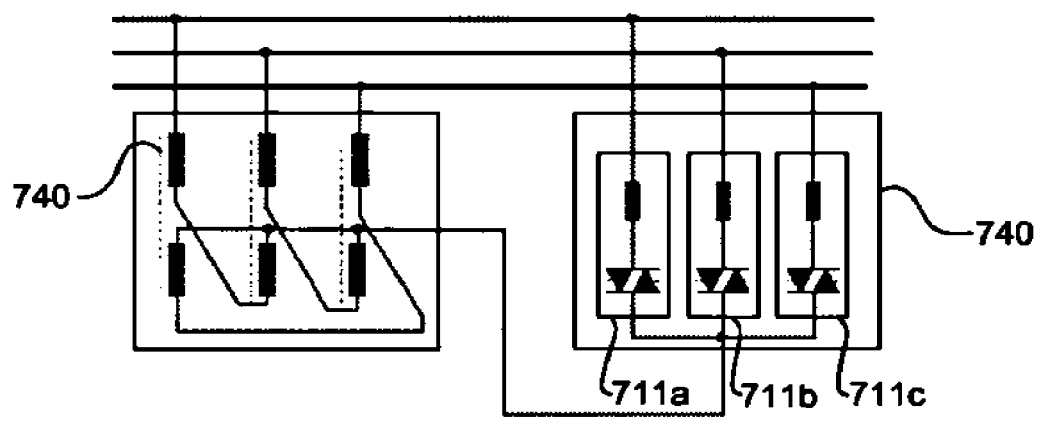
FIG. 7 is a schematic diagram illustrating static var compensation with a wye-connection and a Z-transformer.

FIG. 7 is a schematic diagram illustrating static var compensation with a wye-connection and a Z-transformer. The Z-connected transformer 740 may be utilized to create a local neutral point (artificial neutral) for the voltages in the transmission system. Then a wye-connected thyristor valve of an SVC 740 may be utilized as outlined in FIG. 7. The number of semiconductor devices in wye-connection is significantly lower than if delta-connection for the full transmission network voltage would have been used. Within the SVC 740 there are three compensator strings 711*a-c*. The figure shows a generic string but the SVC configuration 740 may include several TCRs, TSRs, TSCs and filter banks.

The Z-transformer should be designed to let the third harmonic current pass through the transformer. No third harmonic voltage will be generated.

Figure 8:
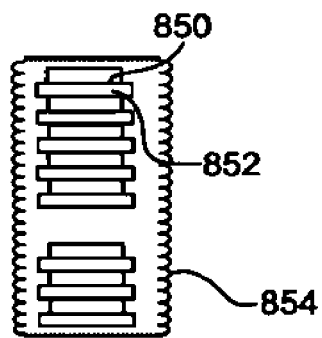
FIG. 8 is a schematic diagram illustrating a stack of bidirectional phase controlled thyristors.

FIG. 8 is a schematic diagram illustrating a stack of bidirectional phase controlled thyristors.

Thyristors having a substantial current handling capability as compared to the normal rated current are available because only low current will be needed at the high rated voltage. This has some interesting implications. Firstly, the junction temperature can be kept close to the case temperature. Secondly, less design problems occur related to surge currents at failures or control errors. And thirdly, it is easy to design for a high overload capability for the SVC.

For this application, so called bidirectional thyristors or bidirectional controlled thyristors (BCT) 850 can be advantageously utilized. These devices have two anti-parallel thyristors integrated on the same silicon wafer. Only one stack of devices then is necessary for each valve function. Between each BCT 850 there is a cooling device 852.

Most apparatus for voltages above 69 kV are designed for outdoor use. This is also a possibility for the thyristor valves mentioned herein. Each valve function contains one stack of (bidirectional) thyristors 850. The stack can be put in an insulating enclosure 854, e.g. formed by polymeric material, with sufficient flashing and creepage distance. FIG. 8 depicts this approach.

Figure 9:
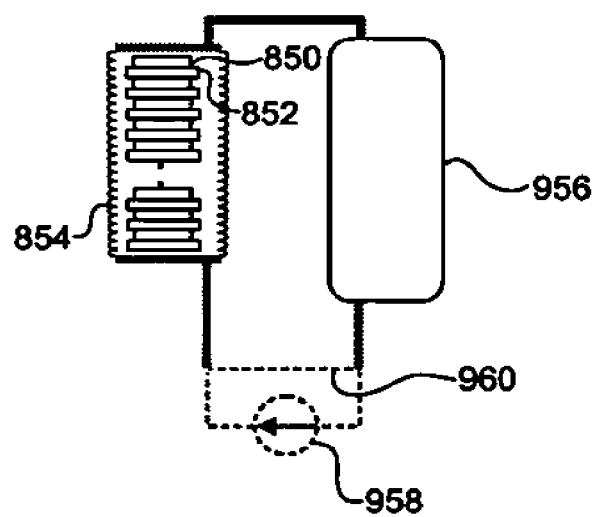
FIG. 9 is a schematic diagram illustrating a valve with individual heat exchanger.

FIG. 9 is a schematic diagram illustrating a valve with individual heat exchanger.

In high voltage SVC valves the rated current becomes moderate and the loss per device is low as compared to conventionally used low-voltage designs. Therefore the temperature drop between junction and case 854 is low and a high temperature of the coolant may be used. This makes the heat-exchanger 956 smaller for a given total amount of power to be treated.

In an innovative design, each valve, which can include a stack of BCTs, has its own cooler either with a separate circulation pump 958 and/or with natural flow 960 of the coolant. FIG. 9 depicts this concept.

Regarding valve erection, the thyristor valves for high voltage become quite long as the number of series-connected devices becomes large (in the range of one hundred devices). Accordingly, it is reasonable to mount such valves hanging from the roof (indoors) or from a steel structure (outdoors).

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A single phase static var compensator system used in connection with a transmission grid, the compensator system comprising:
   a compensator string having a first end and a second end including:
     a static var compensator having a first end and a second end;
     a plurality of serially connected thyristors forming a thyristor group, said thyristor group having a first end and a second end;
     a capacitor having a first end and a second end;
   said first and second ends of said compensator string directly galvanically connected across the transmission grid;
   said first end of said capacitor directly galvanically connected to said first end of said thyristor group and said second end of said capacitor directly galvanically connected to said second end of said thyristor group;
   said transmission grid having a rated voltage exceeding 69 kV.

2. The single phase static var compensator system according to claim 1 wherein said plurality of serially connected thyristors includes at least one hundred thyristors connected serially.

3. The single phase static var compensator system according to claim 1 wherein said plurality of serially connected thyristors comprises bidirectional controlled thyristors.

4. The single phase static var compensator system according to claim 1 wherein said static var compensator comprises an inductor.

5. The single phase static var compensator system according to claim 1 wherein said static var compensator comprises a first static var compensator, and said compensator string further includes:
   a second static var compensator, and
   said plurality of serially connected thyristors are connected on a first end thereof to said first static var compensator and said plurality of serially connected thyristors are connected on a second end thereof to said second static var compensator.

6. The single phase static var compensator system according to claim 5 wherein said first static var compensator and said second static var compensator each comprise an inductor.

7. The single phase static var compensator system according to claim 5 wherein said first static var compensator comprises an inductor and said second static var compensator comprises a capacitor.

8. A three phase static var compensator system used in connection with a three phase transmission grid, the three phase static var compensator system comprising:
three compensator strings, each compensator string directly galvanically connected to one phase of the three phase transmission grid, each compensator string including:
a static var compensator having a first end and a second end;
a plurality of serially connected thyristors forming a thyristor group, said thyristor group having a first end and a second end;
a capacitor having a first end and a second end;
said first end of one of said compensator strings directly galvanically connected to one phase of the transmission grid and said second end of said one of said compensator strings directly galvanically connected to a second phase of the transmission grid;
said first end of said capacitor directly galvanically connected to said first end of said thyristor group and said second end of said capacitor directly galvanically connected to said second end of said thyristor group;
said transmission grid having a rated voltage exceeding 69 kV.

9. The three phase static var compensator system according to claim 8 wherein said plurality of serially connected thyristors comprises bidirectional controlled thyristors.

10. The three phase static var compensator system according to claim 8 wherein said static var compensator comprises an inductor.

11. The three phase static var compensator system according to claim 8 wherein said static var compensator comprises a first static var compensator, and said compensator string further includes:
a second static var compensator, and
said plurality of serially connected thyristors are connected on a first end thereof to said first static var compensator and said plurality of serially connected thyristors are connected on a second end thereof to said second static var compensator.

12. The three phase static var compensator system according to claim 11 wherein said first static var compensator and said second static var compensator each comprise an inductor.

13. The three phase static var compensator system according to claim 11 wherein said first static var compensator comprises an inductor and said second static var compensator comprises a capacitor.

14. The three phase static var compensator apparatus according to claim 8, wherein said compensator string is connected on a first end thereof to said respective phase and on a second end thereof to a transmission grid associated with a different phase than said respective phase, thus forming a delta connection.

15. The three phase static var compensator apparatus according to claim 8, wherein said compensator string is arranged to be connected on a first end thereof to said respective phase and on a second end thereof to a neutral point, thus forming a wye connection.

16. The three phase static var compensator apparatus according to claim 15, wherein said neutral point is connected to a transmission grid.

17. The three phase static var compensator apparatus according to claim 15, wherein said neutral is provided using an artificial neutral from a z-transformer connected to the three respective phases.

* * * * *